Figure 1:
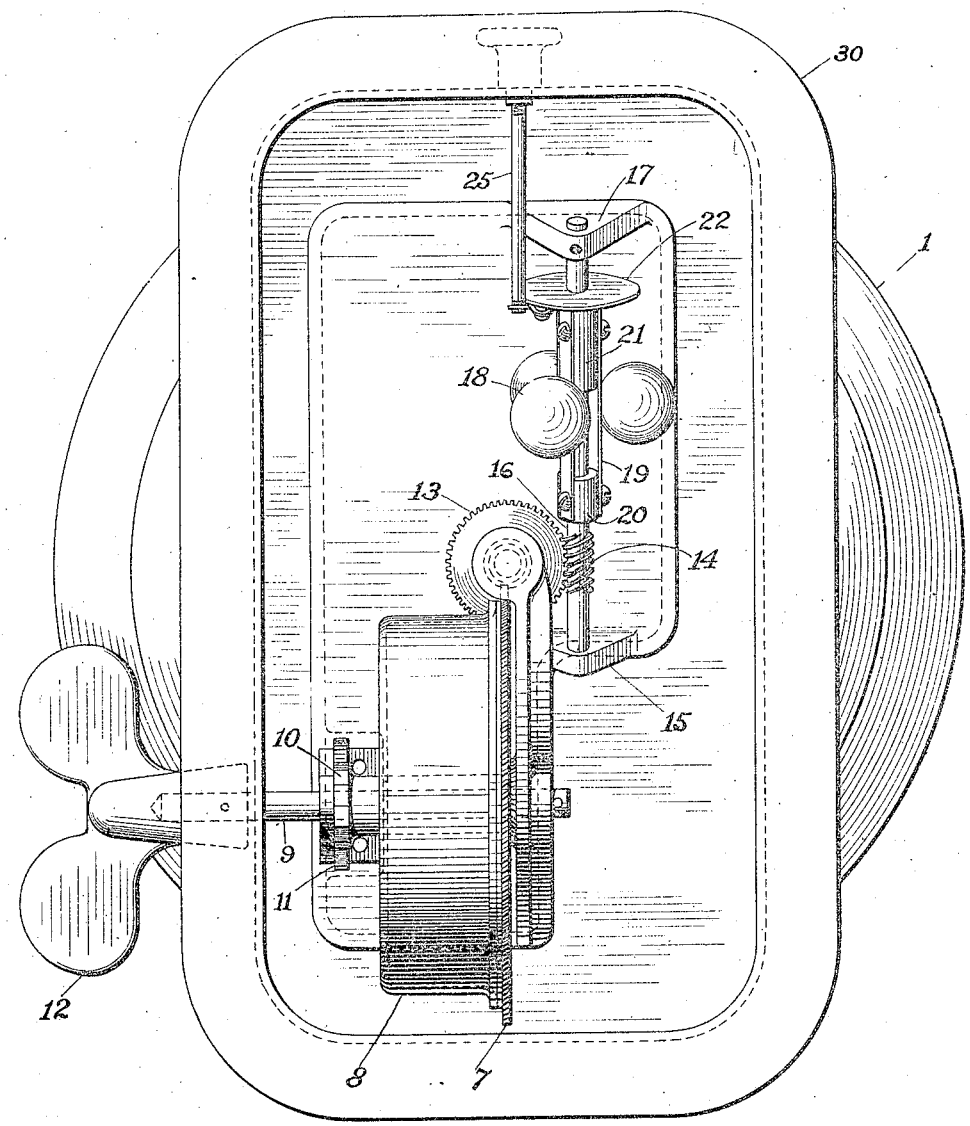

E. R. JOHNSON.
MOTOR FOR TALKING MACHINES.
APPLICATION FILED NOV. 12, 1904.

1,020,206.

Patented Mar. 12, 1912.
2 SHEETS—SHEET 1.

WITNESSES:
Robt. R. Kitchel
Edw. W. Vaill Jr.

INVENTOR
Eldridge R. Johnson
BY
/s/ Pettit
ATTORNEY.

E. R. JOHNSON.
MOTOR FOR TALKING MACHINES.
APPLICATION FILED NOV. 12, 1904.
1,020,206.
Patented Mar. 12, 1912.
2 SHEETS—SHEET 2.
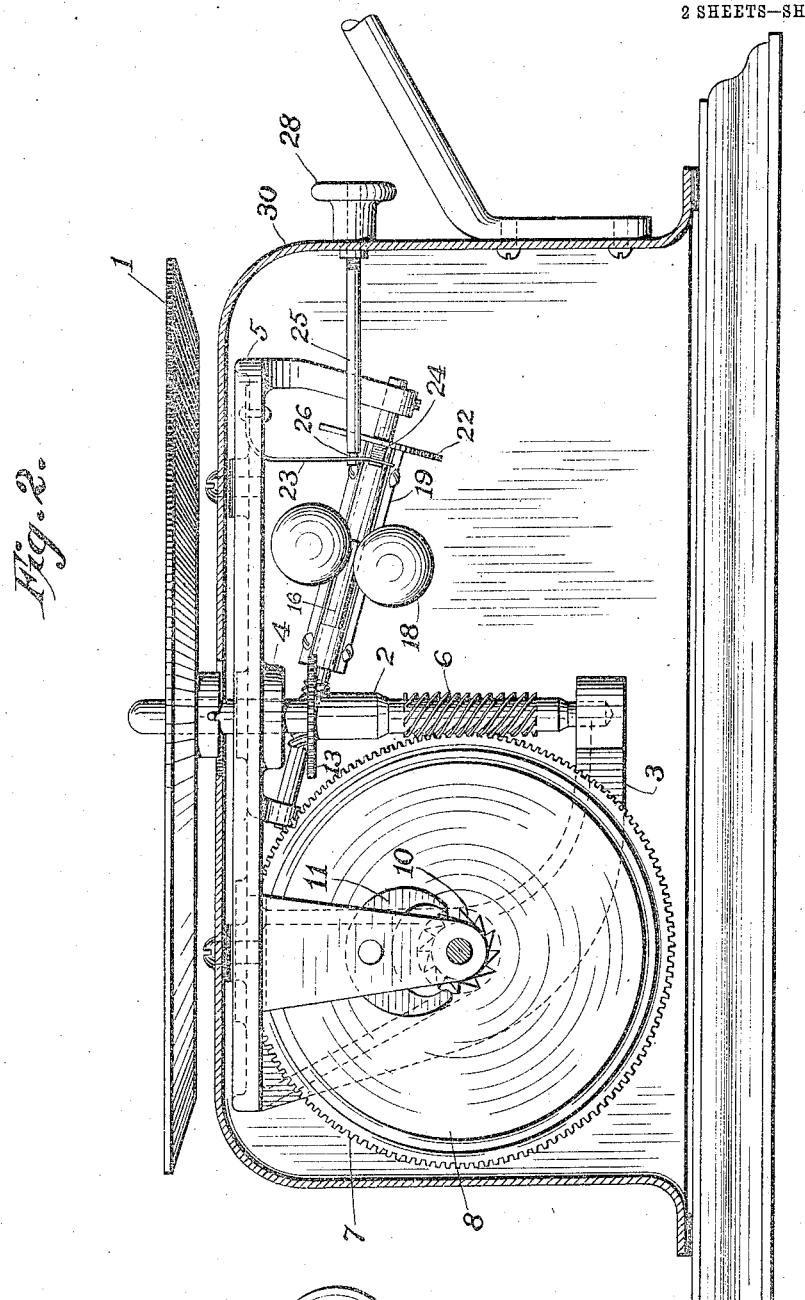
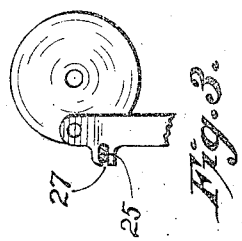
WITNESSES:
Rob¹ R. Kitchel
Edw. W. Vaill Jr.
INVENTOR
Eldridge R. Johnson
By Horace Pettit
ATTORNEY.

UNITED STATES PATENT OFFICE.

ELDRIDGE R. JOHNSON, OF MERION, PENNSYLVANIA, ASSIGNOR TO VICTOR TALKING MACHINE COMPANY, A CORPORATION OF NEW JERSEY.

MOTOR FOR TALKING-MACHINES.

1,020,206.

Specification of Letters Patent.

Patented Mar. 12, 1912.

Application filed November 12, 1904. Serial No. 232,390.

*To all whom it may concern:*

Be it known that I, ELDRIDGE R. JOHNSON, a citizen of the United States, and a resident of Merion, county of Montgomery, State of Pennsylvania, have invented certain new and useful Improvements in Motors for Talking-Machines, of which the following is a full, clear, and exact disclosure.

The object of my invention is to provide such a construction in the driving mechanism for talking machines that the natural vibrations incident to a train of spur gears in a talking machine motor will be practically overcome or reduced to a minimum and further to reduce the parts of said mechanism to the fewest possible number, and that it will be simple, and economical to manufacture, and will be most efficient for the purpose for which they are designed. Heretofore in the manufacture of motors for talking machines, it has usually been customary to connect the source of power, or springs, with the turntable by means of a train of spur gearing, often including bevel gears sometimes including in the train of gearing a worm and also to connect the centrifugal governor with the turntable shaft, or spindle, by means of auxiliary spur gears. It is well known that in the operation of a talking machine any vibrations of the parts of the motor, which are not caused by the reproducer, have undesirable effects upon the reproduction of the record. The vibrations are usually due to the meshing of teeth of the ordinary train of gears, and are of such frequency and strength, even in a carefully constructed motor as to be quite audible. Of course, such vibrations mingle with those produced from the record, and, therefore, impair the quality of the selection being reproduced. Even with the best of spur gears, after the same have been in operation for a period of time, the vibrations produced by the meshing of the gears is impossible to entirely overcome. Furthermore, in the use of a train of spur gears for talking machine motors, vibrations are also produced, which, although not audible to the ear as sound vibrations, yet may be of such a character as to cause the parts of the motor connected with the turntable to be vibrated, and so vibrate the turntable. In some instances this movement is not visible to the eye, and being independently inaudible such vibrations are not evident except in the impaired quality of the reproduction, and it has been difficult for persons not familiar with the practical construction and operation of talking machines to determine just what causes the impaired reproduction of the records. Further in some instances, as where spur gears have become worn, the teeth of the driven gears may intermittently mesh and unmesh with the teeth of the driving gears with a jerky or uneven motion, which causes the turntable to revolve at an uneven speed, which, although the differences of speed are not visible, greatly impair the relative pitch of the successive notes or sounds reproduced from the record.

The object of my invention, therefore, as before stated, is to overcome these objections, which I accomplish by eliminating all intermeshing spur gears and communicating the power on an inclined plane or worm movement and at the same time so arranging the parts as to secure the desired speed in the turntable and governor by the use of the least number of parts.

For a full, clear, and exact description of my invention, reference may be had to the following specification and to the accompanying drawings forming a part thereof, in which—

Figure 1 is a bottom plan view of a talking machine motor embodying my improvements; Fig. 2 is an elevation of the same showing the casing for the motor in section, and Fig. 3 is a detail view showing the relation of the brake of the governor to the brake disk.

Referring to the drawings, the numeral 1 indicates the turntable, and 2 the vertical spindle, upon the upper end of which the turntable 1 is mounted; said turntable spindle 2 has a bearing in a suitable support 3 at its lower end, and passes through a journal or bearing 4 carried by the support plate, or standard, 5, of the motor. Adjacent the lower end of the turntable spindle, 2, I provide a spiral or worm 6, which is adapted to mesh with a worm wheel or gear 7, having inclined teeth to correspond with the inclination of the threads of the worm 6. The gear, 7, is preferably mounted upon, or carried by, the spring barrel or drum, 8, within which is mounted the usual spiral steel spring for furnishing the power to the motor. This spring barrel and spring are mounted upon a suitable shaft 9 which carries a ratchet wheel, 10, adapted to be engaged by a rocking pawl, 11. The shaft, 9, is also adapted to be engaged by a winding key, 12, in any suitable, or well known manner.

Adjacent the upper end of the turntable spindle, 2, but below the bearing, 4, is fixed a spur gear 13 which is adapted to mesh with the worm, 14, carried by the shaft, or spindle, 16, of the centrifugal governor. The governor spindle, 16, is mounted in a pair of supports or hangers 15, and 17, of different lengths, so that the axis of said spindle will be inclined as clearly indicated in Fig. 2. This inclination of the governor spindle will cause the threads of the worm 14, to contact with the teeth of the spur gear at such points where the threads are practically at right angles to the plane of said spur gear. This arrangement will obviate the necessity of making the surfaces of the teeth of the spur gear, 13, inclined to the plane of the gear, and it also tends to provide sufficient space for the governor balls, 18, to revolve in expanded circles as the speed of the motor increases. It is also clear that if the gear, 7, on the drum 8, were so arranged, or journaled, relatively to the worm 6 as in the governor mechanism above described, a spur wheel might be used instead of the worm gear 7. The governor balls, 18, are carried by strips of spring metal, 19, the ends of which are attached to a fixed sleeve 20, and also to a slidable sleeve 21, to which is attached the brake disk 22. A spring strip 23, attached to the supporting plate, 5, of the motor, forms the support for the brake shoe, 24, and is adjustably fixed in position by means of a rod, 25, which has a grooved portion, 26, adapted to be engaged by a notch, or slot, 27, in the brake shoe support, 23. The outer end of the rod, 25, is screw-threaded, and passes through a screw threaded opening in the thumb-nut, 28, said thumb nut, 28, being revolubly fixed in an opening in the casing 30 of the motor. When it is desired to adjust the speed of the motor, the thumbnut, 28, may be turned in one direction, or the other, thereby increasing or diminishing the pressure between the brake shoe, 24, and the brake disk 22. The operation of the other parts of my improved motor will be evident from an inspection of the drawing and the above description of the parts.

It will be seen that by providing the worms and gears as above described, there is no opportunity for the teeth of the gears to slip or knock or to create vibration, or to become worn so as to mesh and unmesh irregularly, or inaccurately. The teeth of the spur gears come accurately into contact with the threads of the worms, and traverse such threads with a wedging or inclined plane action, and since the threads of the worms are in continuous touch and contact with the teeth of the driving gear, the rotation of the shafts upon which the worms are carried, will be smooth, continuous, and unvariable. In this manner the undesirable and harmful vibrations, of other constructions referred to, are obviated or reduced to a minimum, and the running of the machine effected without interfering with the sound vibration reproduced from the sound record.

Having thus described my invention, it will be obvious that changes may be made in form, arrangement, and proportion of parts, without departing from the spirit and scope of my invention, but

What I claim, and desire to protect by Letters Patent, is:—

1. In a motor the combination with a driving shaft, means to drive the same, a spindle, a governor and a governor shaft, and gearing between said driving shaft and said spindle and between said spindle and said governor shaft, all the gearing in said motor consisting of a gear wheel for the driving member of the gearing and a worm for the driven member of the gearing.

2. In a motor the combination with a driving shaft, means to drive the same and a gear wheel mounted on said shaft, of a spindle, a worm mounted on said spindle and meshing directly with said gear on said driving shaft and driven thereby, a gear on said spindle, a governor and a governor shaft, a worm mounted on said governor shaft and meshing directly with said gear on said spindle and driven thereby.

3. In a motor, the combination of a casing, a horizontal spring driven shaft, a vertical worm gear thereon, a vertical shaft suitably journaled in said casing and provided with a worm near its lower end and a spur gear at its upper end, a governor, an inclined governor shaft journaled in brackets depending from the top of said casing, and a worm on said governor shaft meshing with said spur gear.

4. In a motor the combination with a driving shaft, means to drive the same, a spindle, a governor and a governor shaft, and gearing between said driving shaft and said spindle and between said spindle and said governor shaft; the said gearing in said motor consisting of a gear wheel for the driving member of the gearing and a worm for the driven member of the gearing.

In witness whereof, I have hereunto set my hand this 10th day of November, 1904.

ELDRIDGE R. JOHNSON.

Witnesses:
JOHN F. GRADY,
HORACE PETTIS.